United States Patent
Kim

(10) Patent No.: US 11,390,143 B2
(45) Date of Patent: Jul. 19, 2022

(54) AIR VENT FOR VEHICLE

(71) Applicant: HYUNDAI MOBIS CO., LTD., Seoul (KR)

(72) Inventor: Won Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 201 days.

(21) Appl. No.: 16/563,535

(22) Filed: Sep. 6, 2019

(65) Prior Publication Data

US 2020/0079184 A1    Mar. 12, 2020

(30) Foreign Application Priority Data

Sep. 6, 2018 (KR) .................. 10-2018-0106409

(51) Int. Cl.
*B60H 1/34* (2006.01)
(52) U.S. Cl.
CPC ... *B60H 1/3428* (2013.01); *B60H 2001/3471* (2013.01)
(58) Field of Classification Search
CPC ............... B60H 1/3428; B60H 1/3421; B60H 1/00664; B60H 1/00671; B60H 1/00678; B60H 1/3414; B60H 2001/3471; F24F 13/14; F24F 13/1426; F24F 13/06; F16K 1/223; Y10T 137/87531; Y10T 137/86944
USPC ....................................................... 454/154
See application file for complete search history.

(56) References Cited

U.S. PATENT DOCUMENTS

| | | | |
|---|---|---|---|
| 2009/0114868 A1* | 5/2009 | Lee | F16K 39/028 251/305 |
| 2012/0042955 A1* | 2/2012 | Gierszewski | F16K 39/028 137/1 |
| 2017/0176044 A1* | 6/2017 | Kezar | F16H 21/44 |
| 2019/0061478 A1* | 2/2019 | Kramer | F24F 13/1406 |

FOREIGN PATENT DOCUMENTS

DE    102017113906 A1 *    8/2017    ........... B60H 1/3414

* cited by examiner

*Primary Examiner* — Steven B McAllister
*Assistant Examiner* — Charles R Brawner
(74) *Attorney, Agent, or Firm* — NSIP Law

(57) ABSTRACT

An air vent for a vehicle may include: a duct part having an internal path through which air is moved; a first adjusting part rotatably installed in the duct part, and guiding the direction of discharged air while rotated in a side-to-side direction; a second adjusting part rotatably installed in the duct part with the first adjusting part, and adjusting a flow rate and direction of discharged air while rotated in an upward/downward direction or blocking an air flow passing through the duct part; a driving part connected to the second adjusting part and configured to supply power to rotate the second adjusting part; and a rotation pressing part connected to the second adjusting part and elastically supporting the second adjusting part to rotate the second adjusting part in one direction.

9 Claims, 20 Drawing Sheets

AIR VENT FOR VEHICLE

CROSS-REFERENCES TO RELATED APPLICATIONS

The present application claims priority to Korean application number 10-2018-0106409, filed on Sep. 6, 2018, which is incorporated by reference in its entirety.

BACKGROUND OF THE INVENTION

The present invention relates to an air vent for a vehicle, and more particularly, to an air vent for a vehicle, in which a part for controlling the direction of air upward/downward and a damper part for blocking an air flow are implemented as a single module, and which can adjust an air flow rate.

In general, a vehicle includes an air conditioning system for adjusting the internal temperature thereof according to the season, and cool air and warm air which are generated by the air conditioning system are discharged to the inside of the vehicle through an air outlet installed in an instrument panel.

The air outlet has an air vent mounted thereon to adjust the direction and flow rate of warm air or cold air generated by the air conditioning system. That is, the warm air or cold air generated by the air conditioning system may be passed through a duct and then discharged to the inside of the vehicle through the air vent. At this time, a driver adjusts the direction of the discharged air by operating a knob installed on the air vent.

The air vent according to the related art separately includes a part for adjusting the direction of air upward/downward and a damper part for blocking an air flow moved through the air vent, thereby increasing the manufacturing cost. Therefore, there is a demand for a device capable of solving the problem.

The related art of the present invention is disclosed in Korean Patent Application Laid-Open No. 2010-0058374 published on Jun. 3, 2010 and entitled "Air Vent".

SUMMARY OF THE INVENTION

Embodiments of the present invention are directed to an air vent for a vehicle, in which a part for controlling the direction of air upward/downward and a damper part for blocking an air flow are implemented as a single module, and which can adjust an air flow rate.

In one embodiment, an air vent for a vehicle may include: a duct part having an internal path through which air is moved; a first adjusting part rotatably installed in the duct part, and guiding the direction of discharged air while rotated in a side-to-side direction; a second adjusting part rotatably installed in the duct part with the first adjusting part, and adjusting a flow rate and direction of discharged air while rotated in an upward/downward direction or blocking an air flow passing through the duct part; a driving part connected to the second adjusting part and configured to supply power to rotate the second adjusting part; and a rotation pressing part connected to the second adjusting part and elastically supporting the second adjusting part to rotate the second adjusting part in one direction.

The first adjusting part may include: a first adjusting body rotatably installed in the duct part and extended in a top-to-bottom direction; and a side groove formed at a side surface of the first adjusting body.

The air vent may further include a stopper protrusion protruding to the inside of the duct part, and constraining the second adjusting part from being rotated at a preset angle or more, the second adjusting part being connected to the rotation pressing part and rotated.

The second adjusting part may include: a first rotating member rotatably installed in the duct part, connected to the rotation pressing part, pressed so as to be rotated in one direction, and locked to the stopper protrusion so as to be constrained from rotating; and a second rotating member rotatably installed in a connection path formed in the first rotating member, and connected to the driving part and rotated.

The first rotating member may include: a first rotating body having the second rotating member rotatably installed therein, and locked to the stopper protrusion so as to be constrained from rotating; and a first connection member extended from the first rotating member and connected to the rotation pressing part.

The second rotating member may include: a plate-shaped second rotating member rotatably installed in the first rotating member; and a second connection member connecting the second rotating body and the driving part, and rotated by the operation of the driving part.

The second rotating body rotated by the operation of the driving part may be locked to the inner edge of the first rotating body such that the rotations of the first and second rotating bodies are synchronized.

The second rotating body may be constituted by a single member or a plurality of members, and have the same rotation center as the first rotating body.

The driving part may include: a driving body fixed to the duct part; and a second output shaft installed on one side of the driving body and having the second connection member inserted therein.

The rotation pressing part may be connected to the first connection member and include a torsion spring.

In accordance with the embodiment of the present invention, the air vent for a vehicle can implement the function of adjusting the direction of air passing through the inside of the duct part upward/downward, the function of a damper for blocking an air flow, and the function of adjusting an air flow rate through the single module. Therefore, the product can be reduced in size and the manufacturing cost can be reduced.

DESCRIPTION OF SPECIFIC EMBODIMENTS

Hereafter, an air vent for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
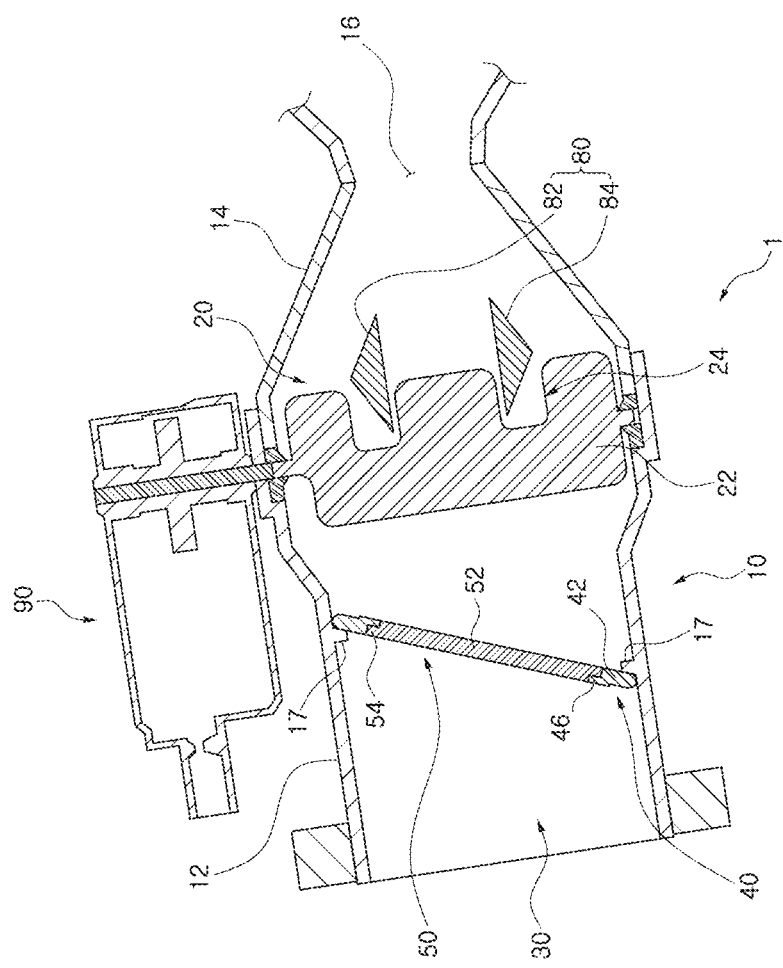
FIG. 1 is a cross-sectional view schematically illustrating a structure of an air vent for a vehicle in accordance with an embodiment of the present invention.
Figure 2:
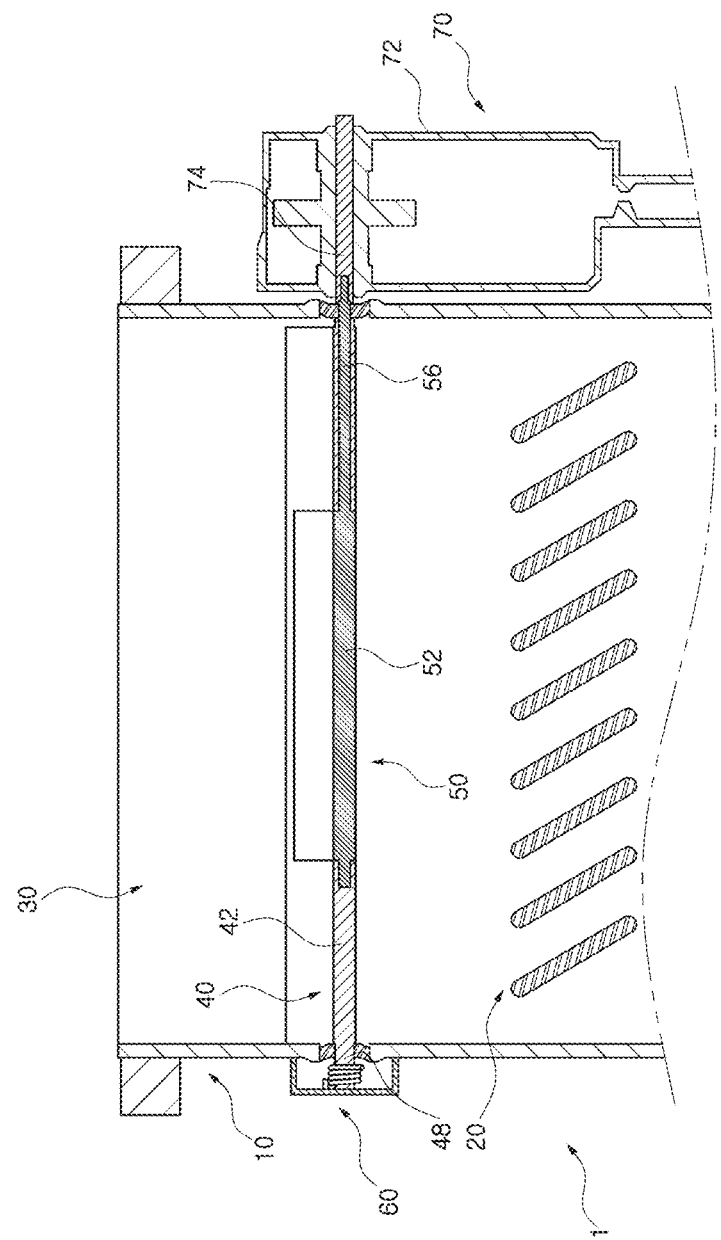
FIG. 2 is a plan view schematically illustrating the structure of the air vent for a vehicle in accordance with the embodiment of the present invention.
Figure 3:
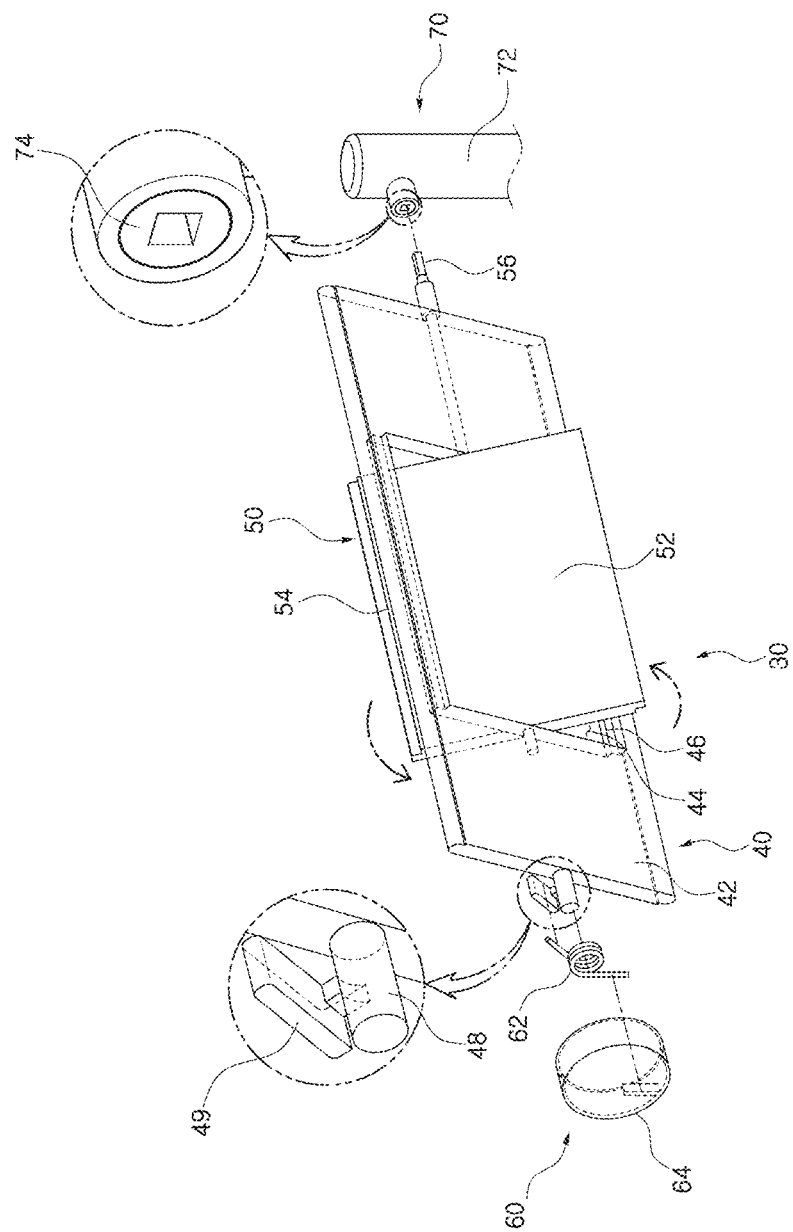
FIG. 3 is an exploded perspective view illustrating a second adjusting part in accordance with the embodiment of the present invention.
Figure 4:
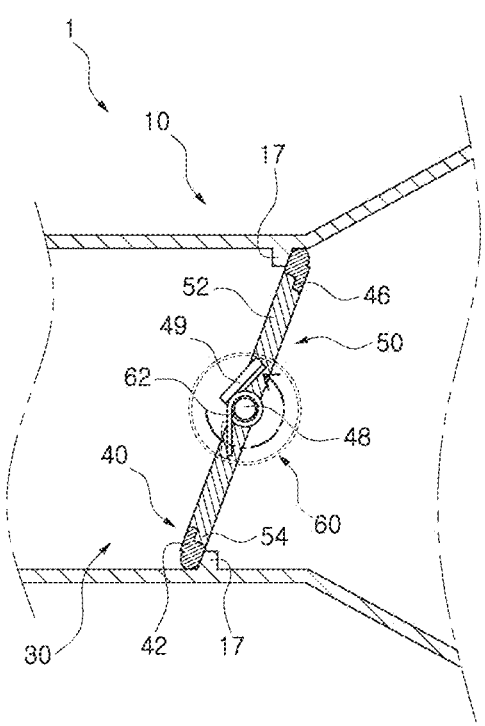
FIG. 4 is a cross-sectional view illustrating that the second adjusting part in accordance with the embodiment of the present invention is locked to a stopper protrusion.
Figure 5:
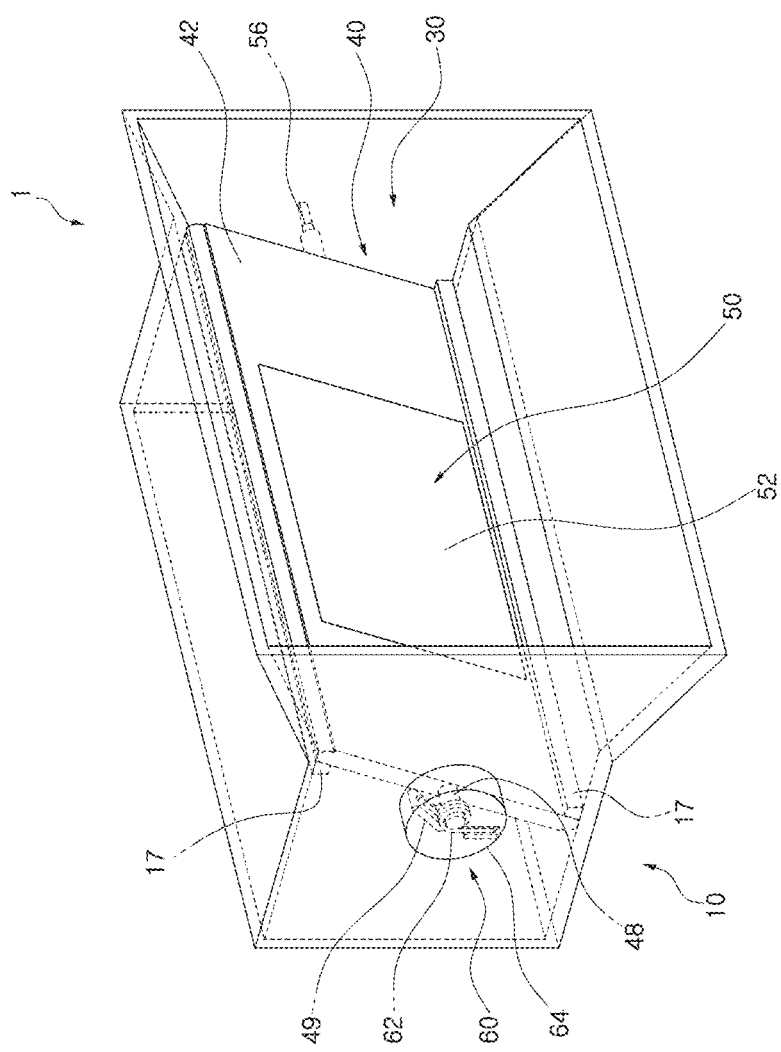
FIG. 5 is a perspective view illustrating that the second adjusting part in accordance with the embodiment of the present invention is locked to the stopper protrusion.
Figure 6:
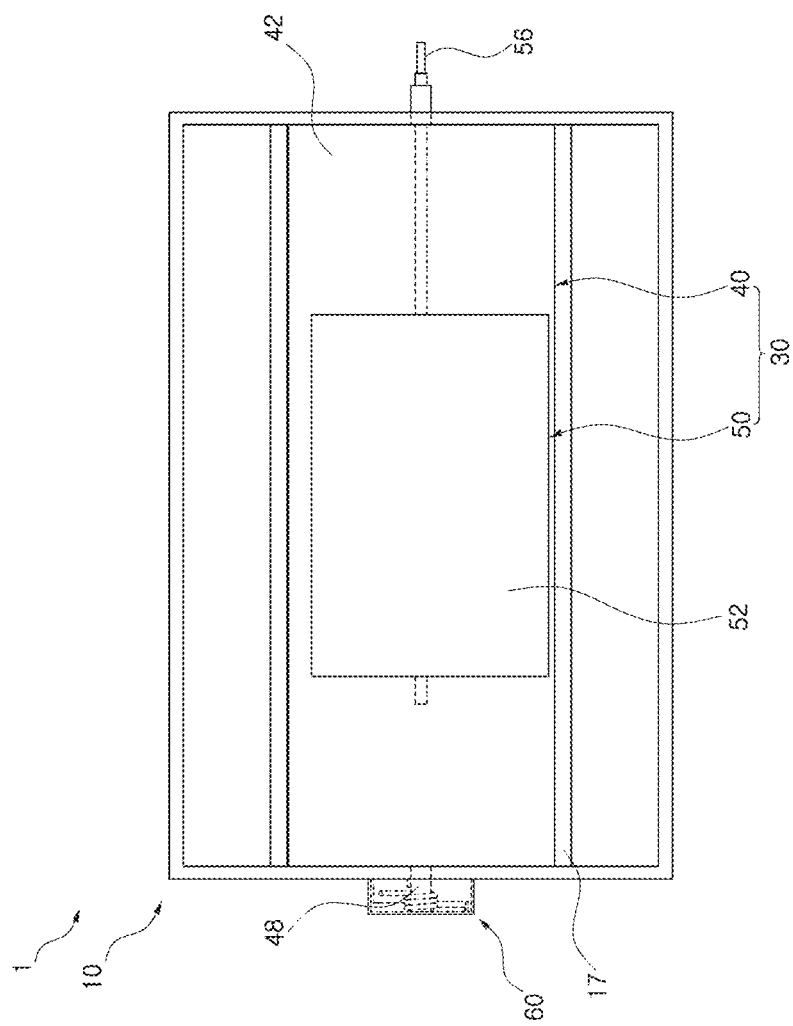
FIG. 6 is a front view illustrating the second adjusting part in accordance with the embodiment of the present invention.
Figure 7:
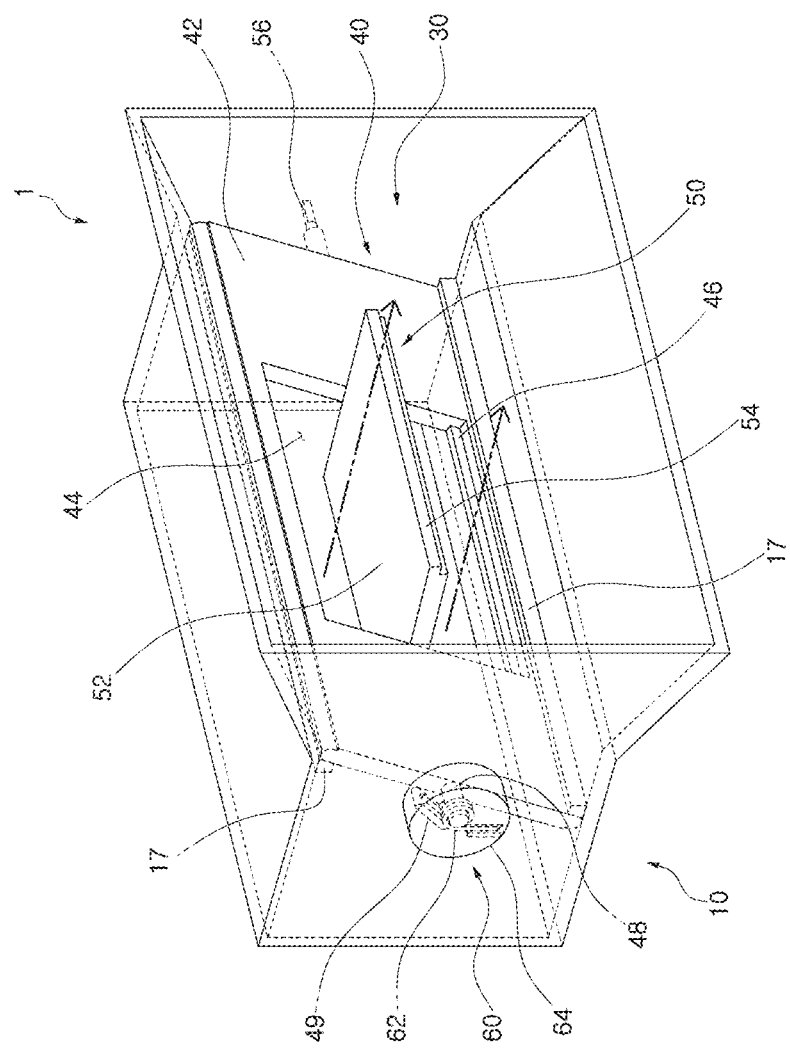
FIG. 7 is a perspective view illustrating that a second rotating member in accordance with the embodiment of the present invention is rotated to open a connection path.

FIG. 1 is a cross-sectional view schematically illustrating a structure of an air vent for a vehicle in accordance with an embodiment of the present invention, FIG. 2 is a plan view schematically illustrating the structure of the air vent for a vehicle in accordance with the embodiment of the present invention, FIG. 3 is an exploded perspective view illustrating a second adjusting part in accordance with the embodiment of the present invention, FIG. 4 is a cross-sectional view illustrating that the second adjusting part in accordance with the embodiment of the present invention is locked to a stopper protrusion, FIG. 5 is a perspective view illustrating that the second adjusting part in accordance with the embodiment of the present invention is locked to the stopper protrusion, FIG. 6 is a front view illustrating the second adjusting part in accordance with the embodiment of the present invention, and FIG. 7 is a perspective view illustrating that a second rotating member in accordance with the embodiment of the present invention is rotated to open a connection path.

As illustrated in FIGS. 1 to 7, the air vent 1 for a vehicle in accordance with the embodiment of the present invention may include a duct part 10, a first adjusting part 20, a second adjusting part 30, a driving part 70 and a rotation pressing part 60. The duct part 10 may have an internal path through which air is moved. The first adjusting part 20 may be rotatably installed in the duct part 10 and guide the direction of discharged air while rotated in a side-to-side direction. The second adjusting part 30 may be rotatably installed in the duct part 10 with the first adjusting part 20, and adjust the flow rate and direction of discharged air while rotating in an upward/downward direction or block an air flow passing through the duct part 10. The driving part 70 may be connected to the second adjusting part 30 and supply power to rotate the second adjusting part 30. The rotation pressing part 60 may be connected to the second adjusting part 30 and elastically support the second adjusting part 30 to rotate the second adjusting part 30 in one direction.

The duct part 10 may be a pipe having an internal path through which air is moved, and include the first adjusting part 20, the second adjusting part 30 and a flow path guide part 80, which are installed therein. The duct part 10 in accordance with the embodiment of the present invention may include first and second ducts 12 and 14.

Since the second duct 14 is connected to the rear of the first duct 12 (right in FIG. 1), the air may be sequentially passed through the first and second ducts 12 and 14, and then discharged to the outside of the duct part 10 through an outlet 16. The second adjusting part 30 may be rotatably installed in the first duct 12, and the flow path guide part 80 may be installed in the second duct 14. Between the second adjusting part 30 and the flow path guide part 80, the first adjusting part 20 may be installed.

The first duct 12 may have stopper protrusions 17 installed at the top and bottom thereof, respectively, facing the second adjusting part 30. The stopper protrusions 17 may protrude to the inside of the duct part 10, and constrain the second adjusting part 30 from being rotated at a preset angle or more, the second adjusting part 30 being connected to the rotation pressing part 60 and rotated.

The first duct 12 may have an internal space that gradually widens from the front (left in FIG. 1) toward the rear (right in FIG. 1) where the second duct 14 is installed. The second duct 14 may have an internal space that gradually narrows from the front (left in FIG. 1) toward the rear (right in FIG. 1) where the outlet 16 is installed.

The first adjusting part 20 may be rotatably installed in the duct part 10, and guide the discharged air in the side-to-side direction while rotated in the side-to-side direction. The first adjusting part 20 in accordance with the embodiment of the present invention may include a first adjusting body 22 and a side groove 24. The plurality of first adjusting parts 20 may be installed in the duct part 10.

The first adjusting body 22 may be rotatably installed in the duct part 10 and extended in the top-to-bottom direction. The first adjusting body 22 formed in a rectangular plate shape may be erected in the duct part 10. The plurality of first adjusting bodies 22 may be connected through a link and rotated together.

The side groove 24 may be formed at a side surface of the first adjusting body 22, facing the flow path guide part 80. Therefore, since the flow path guide part 80 is positioned in the side groove 24 when the first adjusting body 22 is rotated, the first adjusting body 22 may be prevented from interfering with the flow path guide part 80.

The first adjusting part 20 may adjust an air flow A in the side-to-side direction of the air vent 1 for a vehicle. Since the first adjusting part 20 is directly connected to an actuator 90 installed outside the duct part 10 and rotated, the number of parts can be minimized.

The second adjusting part 30 may be modified in various shapes, as long as the second adjusting part 30 is rotatably installed in the duct part 10 with the first adjusting part 20 and guides the flow rate and direction of discharged air while rotated in the upward/downward direction or blocks an air flow passing through the duct part 10. The second adjusting part 30 in accordance with the embodiment of the present invention may include a first rotating member 40 and a second rotating member 50.

The first rotating member 40 may be formed in various shapes, as long as the first rotating member 40 is rotatably installed in the duct part 10, connected to the rotation pressing part 60, pressed so as to rotate in one direction, and locked to the stopper protrusion 17 so as to be constrained from rotating.

The first rotating member 40 in accordance with the embodiment of the present invention may include a first rotating body 42 and a first connection member 48. The first rotating body 42, in which the second rotating member 50 is rotatably installed therein, may be locked to the stopper protrusion 17 and constrained from rotating, and the first connection member 48 may be extended from the first rotating body 42 and connected to the rotation pressing part 60.

The first rotating body 42 may be formed in a rectangular frame shape and have a connection path 44 formed therein, and the first connection member 48 may be connected to the rotation center of the first rotating body 42. The first rotating body 42 may have a first stepped part 46 formed on the inside thereof, facing the second rotating member 50. The first stepped part 46 may form a stepped portion at a position facing a second stepped part 54 of the second rotating member 50.

A support plate 49 may be connected to the first connection member 48 extended toward the rotation pressing part 60. Since a torsion spring 62 installed in the rotation pressing part 60 is locked to the support plate 49, an elastic pressing force may be transferred to rotate the support plate 49 and the first connection member 48 in one direction. The first connection member 48 extended from either side of the first rotating body 42 may be rotatably installed in the duct part 10.

The first rotating member 40 may serve to perform a damper on/off function and adjust the direction of air downward/upward, with the second rotating member 50. The first rotating member 40 may be rotated about the first connection member 48 serving as a rotating shaft connected to the duct part 10, and fastened to the torsion spring 62 of the rotation pressing part 60 so as to receive a continuous rotational force in one direction.

The second rotating member 50 may be formed in various shapes, as long as the second rotating member 50 is rotatably installed in the connection path 44 formed in the first rotating member 40, and connected to the driving part 70 and rotated. The second rotating member 50 in accordance with the embodiment of the present invention may include a second rotating body 52, a second stepped part 54 and a second connection member 56.

The second rotating body 52 may be formed in a plate shape and rotatably installed in the first rotating body 42, and the second connection member 56 may connect the second rotating body 52 to the driving part 70 and be rotated by the operation of the driving part 70. The second rotating body 52 may have the same area as the first rotating body 42, and the ratio of the areas of the first and second rotating bodies 42 and 52 may be adjusted, if necessary. In the embodiment of the present invention, since the first rotating body 42 has a larger area than the second rotating body 52, the second rotating body 52 may be rotatably installed in the first rotating body 42.

The second stepped part 54 may be formed on either side of the second rotating body 52, facing the first stepped part 46. The second stepped part 54 may form a stepped portion engaged with the first stepped part 46. Thus, when the second rotating member 50 rotated in the clockwise direction (based on FIG. 4) is contacted with the first rotating member 40, the first and second stepped parts 46 and 54 may be engaged with each other, and the first and second rotating members 40 and 50 may be rotated together.

The second connection member 56 connected to one side (right in FIG. 2) of the second rotating body 52 may be connected to an output shaft 74 of the driving part 70 through the inside of the first connection member 48. The second connection member 56 connected to the other side (left of FIG. 2) of the second rotating body 52 may be rotatably installed in the first rotating body 42 facing the connection path 44.

Since the second rotating body 52 rotated by the operation of the driving part 70 is locked to the inner edge of the first rotating body 42 such that the rotations of the first and second rotating bodies 42 and 52 are synchronized, the first and second rotating bodies 42 and 52 may be rotated together.

The second rotating body 52 may be constituted by a single member or a plurality of members, and have the same rotation center as the first rotating body 42. The second rotating member 50 may serve to adjust the direction of air downward/upward and adjust an air flow rate, with the first rotating member 40.

Since the second rotating member 50 is fastened to the output shaft 74 of the driving part 70 using a motor, the second rotating member 50 may be rotated by a motor force.

The first and second rotating members 40 and 50 in accordance with the embodiment of the present invention may constitute a closed damper, and the air flow rate can be adjusted through an area difference between the first and second rotating members 40 and 50. At this time, the air flow rate cannot be adjusted in advance, and can be selectively adjusted to 0%, 50% or 100%. The air flow rate may be changed according to the ratio of the areas of the first and second rotating members 40 and 50.

The rotation pressing part 60 may be modified in various shapes, as long as the rotation pressing part 60 is connected to the second adjusting part 30 and elastically supports the second adjusting part 30 to rotate the second adjusting part 30 in one direction. The rotation pressing part 60 in accordance with the embodiment of the present invention may be connected to the first connection member 48, and include the torsion spring 62 to provide an elastic pressing force.

The rotation pressing part 60 in accordance with the embodiment of the present invention may be fixed to a side surface of the duct part 10, and connected to the first connection member 48 of the first rotating member 40 so as to generate a rotational force. The rotation pressing part 60 in accordance with the embodiment of the present invention may include a case 64 and the torsion spring 62. The case 64 may be fixed to the side surface of the duct part 10, and the torsion spring 62 may be installed in the case 64 and have one side supported by the case 64 and the other side supported by the support plate 49 of the first rotating member 40.

The driving part 70 may include various types of driving devices, as long as the driving part 70 is connected to the second adjusting part 30 and supplies power to rotate the second adjusting part 30. The driving part 70 in accordance with the embodiment of the present invention may include a driving body 72 fixed to the duct part 10 and the output shaft 74 installed on one side of the driving body 72. Since the output shaft 74 is rotated by the operation of the driving body 72 having a motor installed therein and the second connection member 56 is inserted into the output shaft 74, the second rotating member 50 may be rotated with the output shaft 74.

The air vent 1 for a vehicle in accordance with the embodiment of the present invention may further include the flow path guide part 80 installed between the second adjusting part 30 and the outlet 16 of the duct part 10, and guiding the movement of air having passed through the second adjusting part 30 to the outlet 16. The flow path guide part 80 in accordance with the embodiment of the present invention may be constituted by a plurality of flow path guide parts 80 which are horizontally installed in the duct part 10, and have a longitudinal cross-section formed in a triangle shape. Thus, the flow path guide part 80 may guide an air flow A more reliably.

The flow path guide part 80 in accordance with the embodiment of the present invention may include first and second guides 82 and 84, and the second guide 84 may be installed under the first guide 82. The first and second guides 82 and 84 may be horizontally installed in the duct part 10, and have a longitudinal cross-section formed in a triangle shape. The first and second guides 82 and 84 may be positioned between the first adjusting part 20 and the outlet 16, and facing surfaces of the first and second guides 82 and 56 may be formed as flat surfaces. Therefore, a linear air flow A may be formed through a space formed between the first and second guides 82 and 84. Furthermore, an air flow A may also be formed through a space formed between the first guide 82 and the duct part 10. Alternatively, the air flow A may also be formed through a space formed between the second guide 84 and the duct part 10.

The air flow A passing between the first guide 82 and the duct part 10 may be moved upward at the front of the first guide (left side in FIG. 1) based on the first guide 82. The air flow A having passed through the first guide 82 may be moved downward. At this time, since the first guide 82 has a triangle shape to protrude toward the duct part 10, the first guide 82 may more stably guide the air flow A passing between the first guide 82 and the duct part 10.

The air flow A passing between the second guide 84 and the duct part 10 may be moved downward at the front of the second guide 84 based on the second guide 84. The air flow A having passed through the second guide 84 may be moved upward. At this time, since the second guide 84 has a triangle shape to protrude toward the duct part 10, the second guide 84 may more stably guide the air flow A passing between the second guide 84 and the duct part 10.

The air vent 1 for a vehicle in accordance with the embodiment of the present invention can implement the air direction and flow rate adjusting function and the damp on/off function by utilizing the single driving part 70.

Hereafter, the operation of the air vent 1 for a vehicle in accordance with the embodiment of the present invention will be described in detail with reference to the accompanying drawings.

Figure 8:
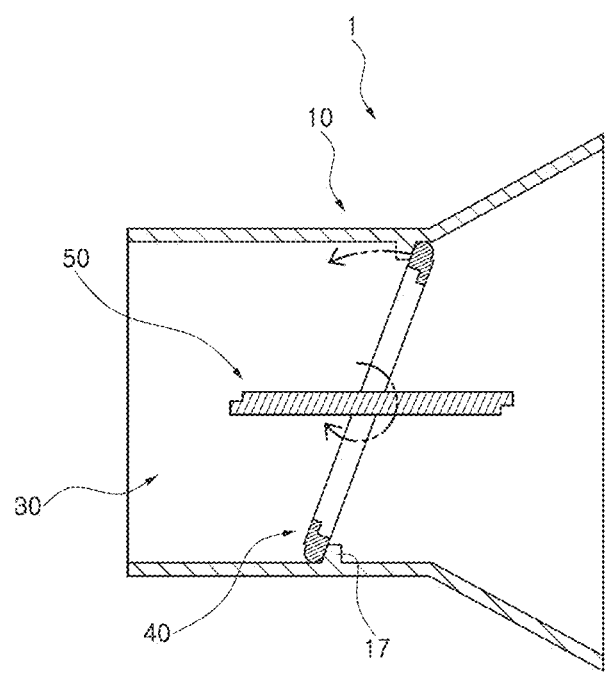
FIG. 8 is a cross-sectional view illustrating that the flow rate of discharged air is reduced because only the second rotating member in accordance with the embodiment of the present invention is rotated to open the connection path.
Figure 9:
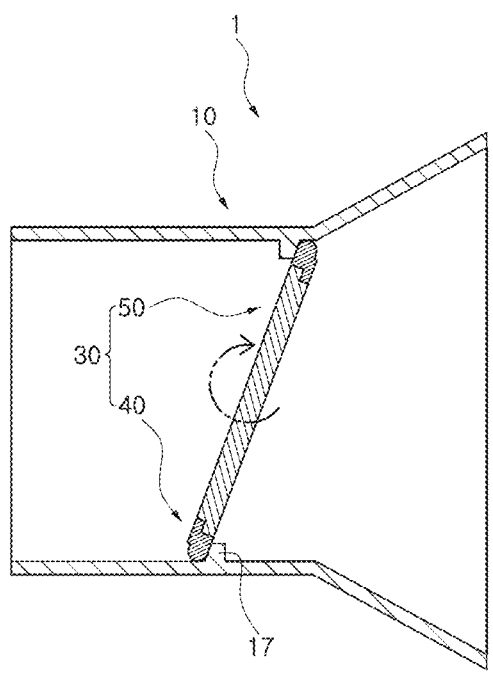
FIG. 9 is a cross-sectional view illustrating that the second rotating member in accordance with the embodiment of the present invention is rotated to close the connection path.
Figure 10:
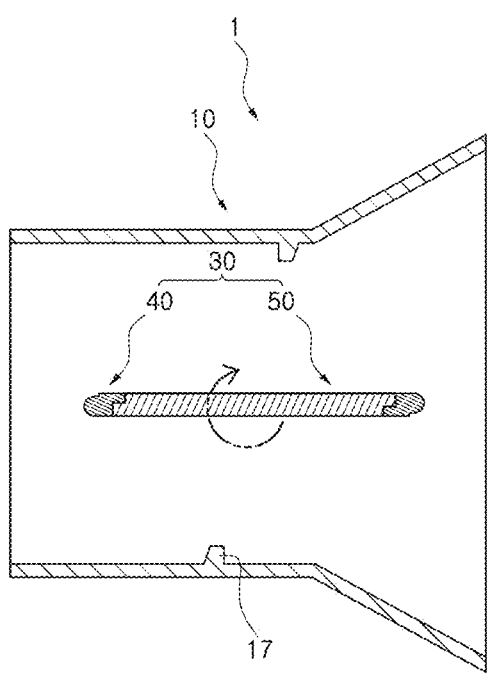
FIG. 10 is a cross-sectional view illustrating that both of first and second rotating members in accordance with the embodiment of the present invention are rotated to maximize the flow rate of discharged air.

FIG. 8 is a cross-sectional view illustrating that the flow rate of discharged air is reduced because only the second rotating member in accordance with the embodiment of the present invention is rotated to open the connection path, FIG. 9 is a cross-sectional view illustrating that the second rotating member in accordance with the embodiment of the present invention is rotated to close the connection path, and FIG. 10 is a cross-sectional view illustrating that both of the first and second rotating members in accordance with the embodiment of the present invention are rotated to maximize the flow rate of discharged air.

As illustrated in FIG. 8, the first rotating member 40 may be locked to the stopper protrusion 17, and the second rotating member 50 may be rotated by the operation of the driving part 70 and horizontally positioned in the duct part 10. In this case, the air may be supplied at a flow rate of only 50% through the duct part 10. Due to an area difference between the first and second rotating bodies 42 and 52, the air may be discharged at a flow rate of 50%.

At this time, since a counterclockwise force is transferred to the first rotating member 40 by the torsion spring 62, the contact between the first rotating member 40 and the stopper protrusion 17 may be maintained.

As illustrated in FIG. 9, the second rotating member 50 may be rotated in the counterclockwise direction by the operation of the driving part 70 and contacted with the first rotating member 40, thereby blocking the air flow moved through the duct part 10.

Therefore, the flow rate of air discharged through the duct part 10 may be 0%.

As illustrated in FIG. 10, the second rotating member 50 may be additionally rotated in the clockwise direction and horizontally positioned in the duct part 10, with the second rotating member 50 contacted with the first rotating member 40. In this case, the air may be supplied through the duct part 10 at a flow rate of 100%. At this time, since the second stepped part 54 of the second rotating member 50 is engaged and rotated with the first stepped part 46 of the first rotating member 40, the entire second adjusting part 30 may be rotated to adjust the flow rate of air.

In order to rotate the first rotating member 40 with the second rotating member 50 in the clockwise direction, the rotational torque of the driving part 70 needs to be larger than the torque of the torsion spring 62. Furthermore, since the first stepped part 46 is contacted and engaged with the second stepped part 54, force transfer may be performed.

Figure 11:
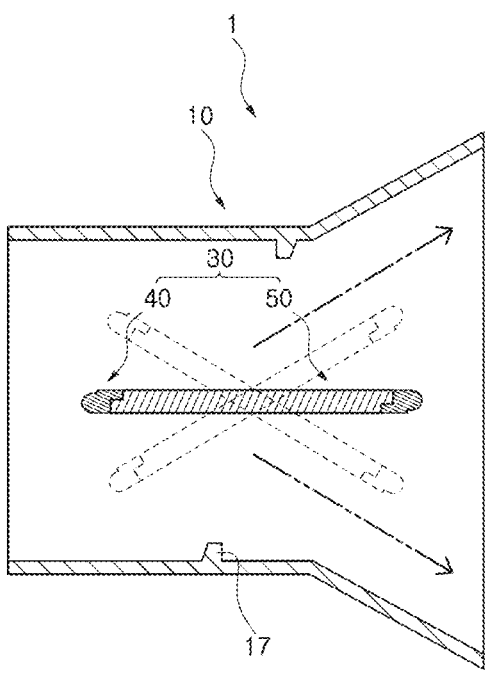
FIG. 11 is a cross-sectional view illustrating that both of the first and second rotating members in accordance with the embodiment of the present invention are rotated to adjust the direction of air.
Figure 12:
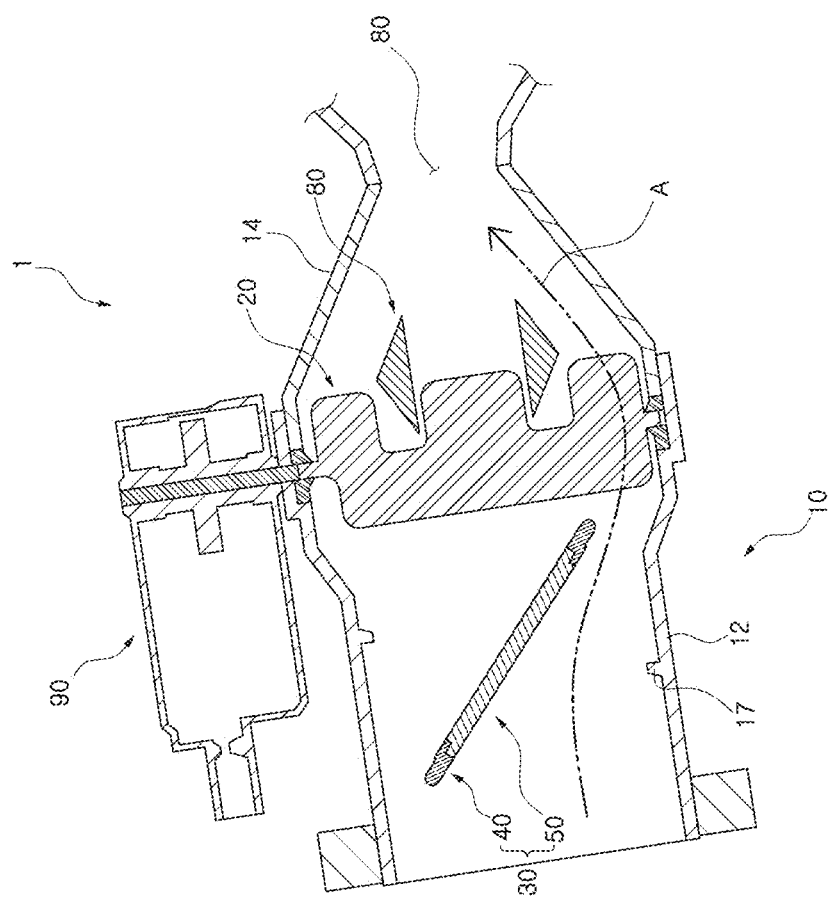
FIG. 12 is a cross-sectional view illustrating that the air vent for a vehicle in accordance with the embodiment of the present invention is operated in an upward mode at the maximum flow rate.
Figure 13:
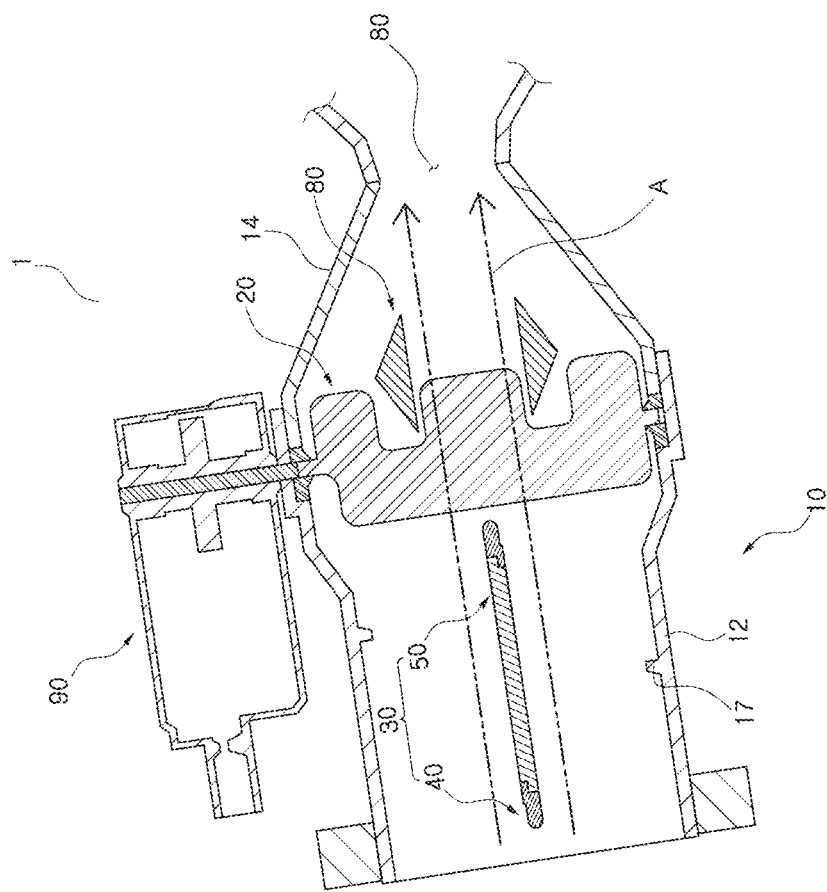
FIG. 13 is a cross-sectional view illustrating that the air vent for a vehicle in accordance with the embodiment of the present invention is operated in a normal mode at the maximum flow rate.
Figure 14:
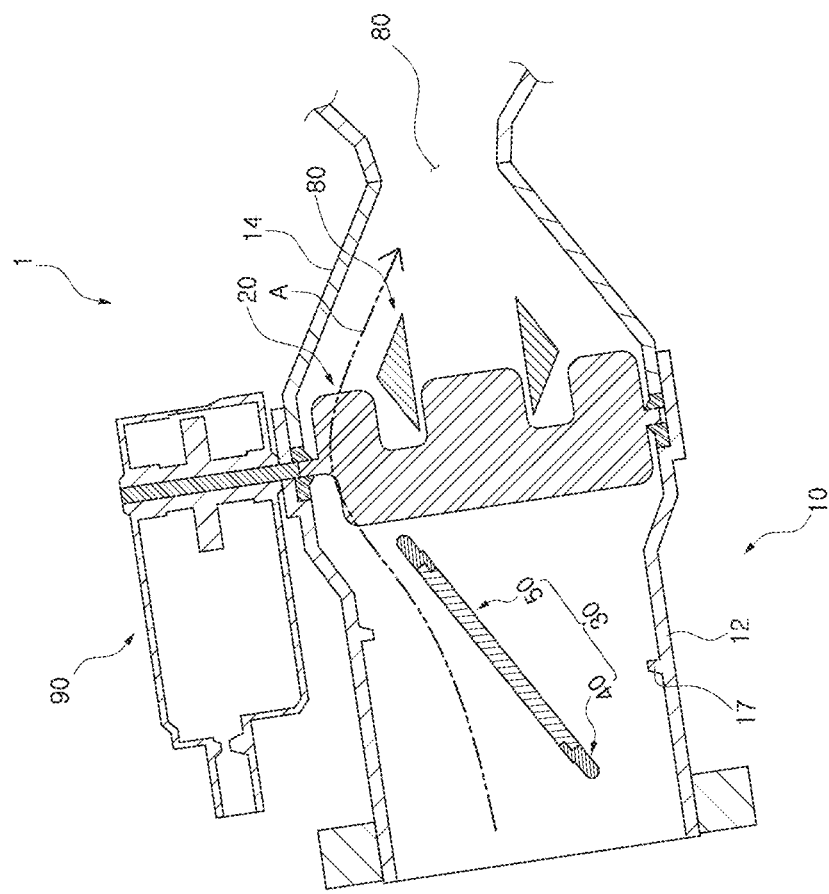
FIG. 14 is a cross-sectional view illustrating that the air vent for a vehicle in accordance with the embodiment of the present invention is operated in a downward mode at the maximum flow rate.

FIG. 11 is a cross-sectional view illustrating that both of the first and second rotating members in accordance with the embodiment of the present invention are rotated to adjust the direction of air, FIG. 12 is a cross-sectional view illustrating that the air vent for a vehicle in accordance with the embodiment of the present invention is operated in an upward mode at the maximum flow rate, FIG. 13 is a cross-sectional view illustrating that the air vent for a vehicle in accordance with the embodiment of the present invention is operated in a normal mode at the maximum flow rate, and FIG. 14 is a cross-sectional view illustrating that the air vent for a vehicle in accordance with the embodiment of the present invention is operated in a downward mode at the maximum flow rate.

As illustrated in FIG. 11, the second rotating member 50 may be rotated with the first rotating member 40 and adjust the air flow A upward or downward. Thus, the direction of the air flow may be easily adjusted upward or downward.

As illustrated in FIG. 12, when the second rotating member 50 is rotated with the first rotating member 40 and inclined downward in the duct part 10, the air flow A along the duct part 10 may be passed through the bottom of the second adjusting part 30 and the bottom of the second guide 84 of the flow path guide part 80, and then discharged in an upward oblique direction. Thus, the air may be discharged in the upward mode at a flow rate of 100%.

As illustrated in FIG. 13, when the second rotating member 50 is rotated with the first rotating member 40 and horizontally positioned in the duct part 10, the air flow A along the duct part 10 may be passed through the top and bottom of the second adjusting part 30 and the flow path guide part 80, and then discharged in a linear direction. Thus, the air may be discharged in the normal mode at a flow rate of 100%.

As illustrated in FIG. 14, when the second rotating member 50 is rotated with the first rotating member 40 and inclined upward in the duct part 10, the air flow A along the duct part 10 may be passed through the top of the second adjusting part 30 and the top of the first guide 82 of the flow path guide part 80, and then discharged in a downward oblique direction. Thus, the air may be discharged in the downward mode at a flow rate of 100%.

Figure 15:
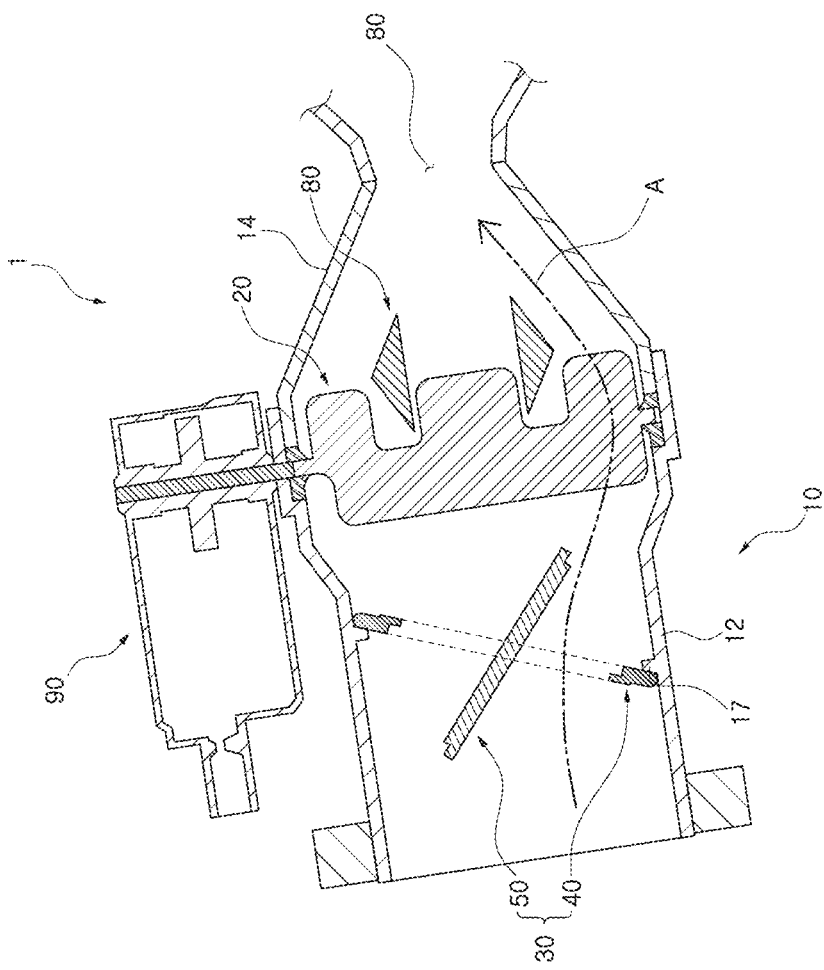
FIG. 15 is a cross-sectional view illustrating that the air vent for a vehicle in accordance with the embodiment of the present invention is operated in the upward mode at a flow rate of 50%.
Figure 16:
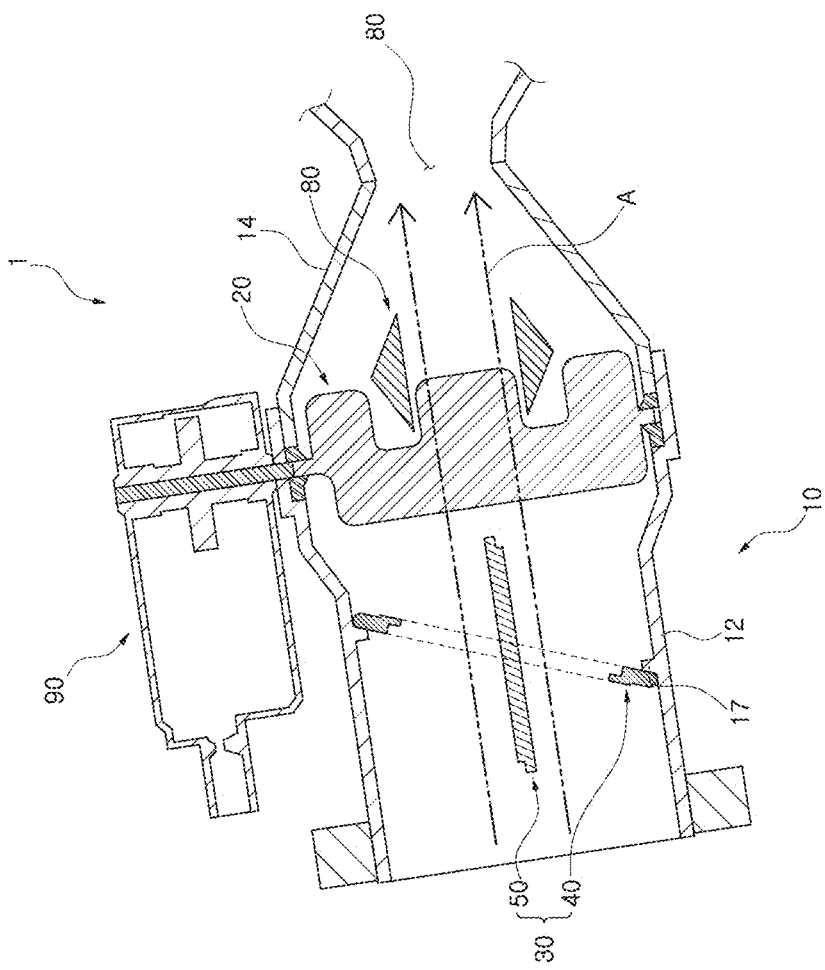
FIG. 16 is a cross-sectional view illustrating that the air vent for a vehicle in accordance with the embodiment of the present invention is operated in the normal mode at a flow rate of 50%.
Figure 17:
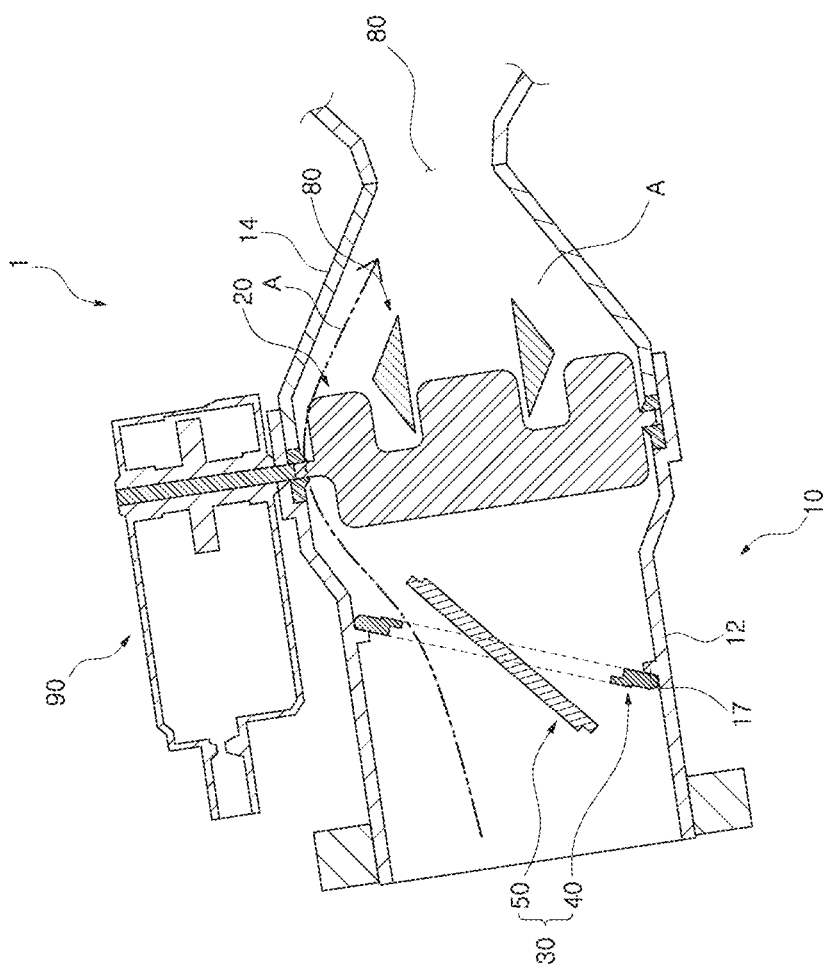
FIG. 17 is a cross-sectional view illustrating that the air vent for a vehicle in accordance with the embodiment of the present invention is operated in the downward mode at a flow rate of 50%.
Figure 18:
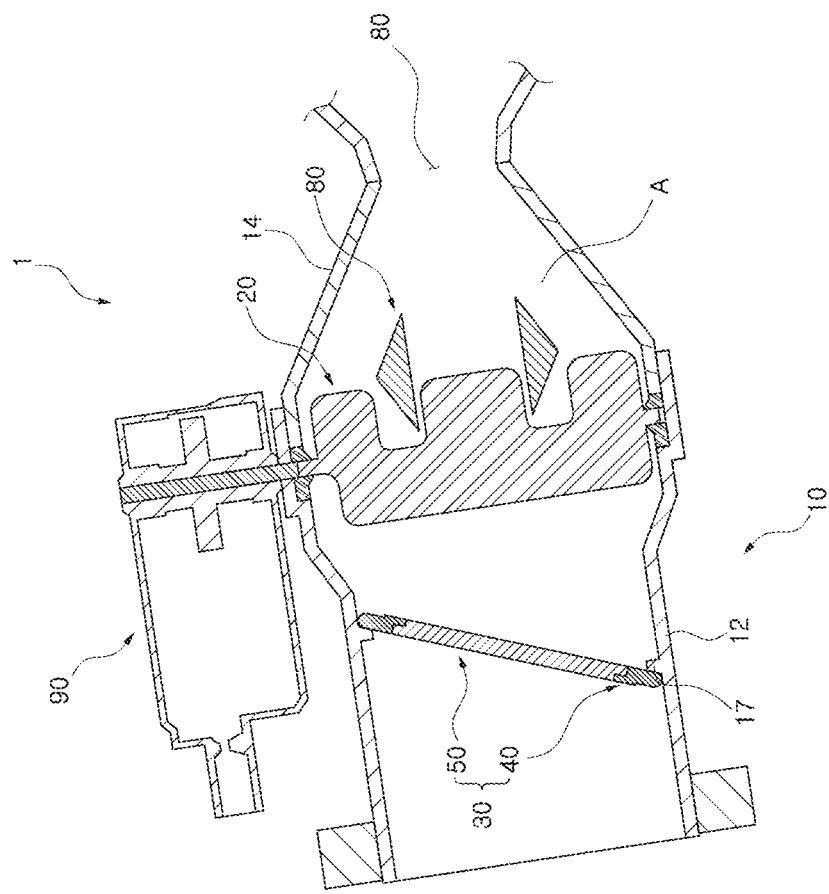
FIG. 18 is a cross-sectional view illustrating that the second adjusting part in accordance with the embodiment of the present invention blocks the inside of a duct part to cut off an air flow.

FIG. 15 is a cross-sectional view illustrating that the air vent for a vehicle in accordance with the embodiment of the present invention is operated in the upward mode at a flow rate of 50%, FIG. 16 is a cross-sectional view illustrating that the air vent for a vehicle in accordance with the embodiment of the present invention is operated in the normal mode at a flow rate of 50%, FIG. 17 is a cross-sectional view illustrating that the air vent for a vehicle in accordance with the embodiment of the present invention is operated in the downward mode at a flow rate of 50%, and FIG. 18 is a cross-sectional view illustrating that the second adjusting part in accordance with the embodiment of the present invention blocks the inside of the duct part to cut off an air flow.

As illustrated in FIG. 15, when the first rotating member 40 is locked to the stopper protrusion 17 and only the second rotating member 50 is inclined downward in the duct part 10, the air flow A along the duct part 10 may be passed through the connection path 44, passed through the bottom of the second rotating member 50 and the bottom of the second guide 84 of the flow path guide part 80, and then discharged in the upward oblique direction. Thus, the air may be discharged in the upward mode at a flow rate of 50%.

As illustrated in FIG. 16, when the first rotating member 40 is locked to the stopper protrusion 17 and only the second rotating member 50 is horizontally positioned in the duct part 10, the air flow A along the duct part 10 may be passed through the connection path 44, passed through the top and bottom of the second adjusting part 30 and the flow path guide part 80, and then discharged in the linear direction. Thus, the air may be discharged in the normal mode at a flow rate of 50%.

As illustrated in FIG. 17, when the first rotating member 40 is locked to the stopper protrusion 17 and only the second rotating member 50 is inclined upward in the duct part 10, the air flow A along the duct part 10 may be passed through the connection path 44, passed through the top of the second rotating member 50 and the top of the first guide 82 of the flow path guide part 80, and then discharged in the downward oblique direction. Thus, the air may be discharged in the downward mode at a flow rate of 50%.

As illustrated in FIG. 18, when the first rotating member 40 is locked to the stopper protrusion 17 and the second rotating member 50 is contacted with the first rotating member 40, the air flow A along the duct part 10 may be blocked by the second adjusting part 30.

Since the air flow is passed through the connection path 44, passed through the top of the second rotating member 50 and the top of the first guide 82 of the flow path guide part 80, and then discharged in the downward oblique direction, the air may be discharged in the downward mode at a flow rate of 50%.

Hereafter, an air vent 3 for a vehicle in accordance with another embodiment of the present invention will be described with reference to the drawings.

For convenience of description, components which are configured and operated in the same manner as those of the above-described embodiment may be represented by like reference numerals, and the detailed descriptions thereof are omitted herein.

Figure 19:
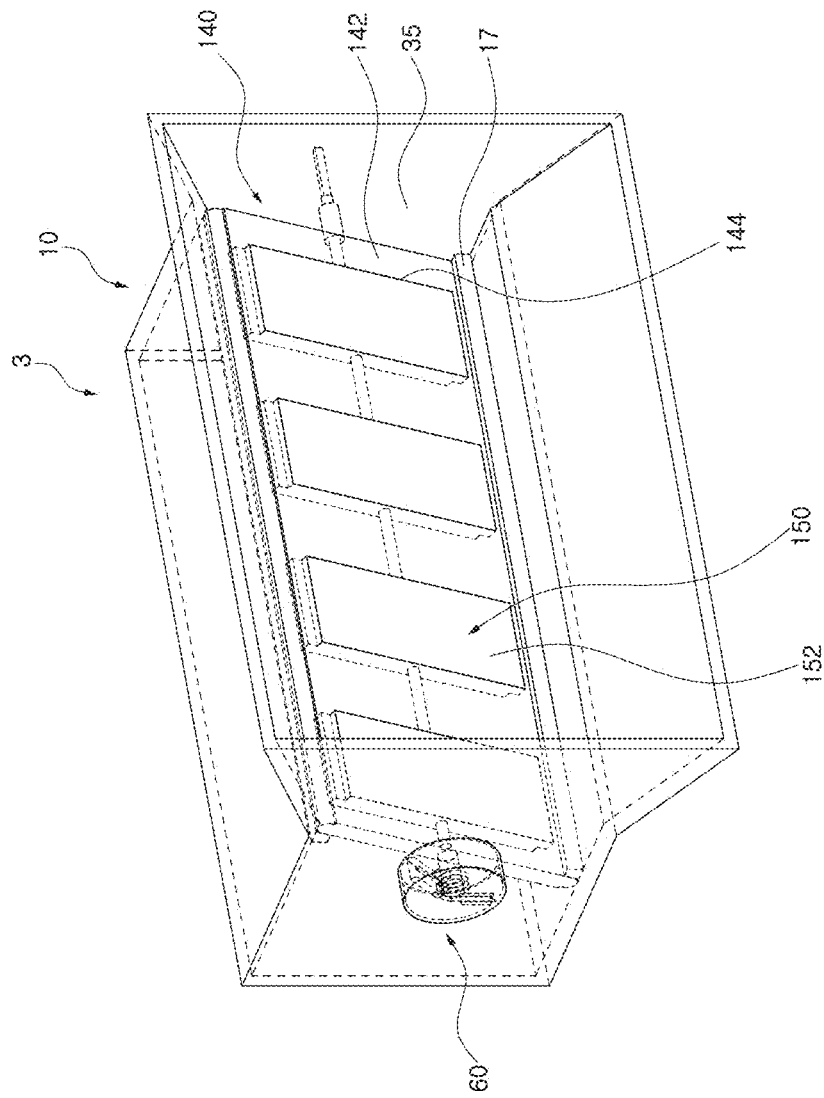
FIG. 19 is a perspective view illustrating an air vent for a vehicle in accordance with another embodiment of the present invention.
Figure 20:
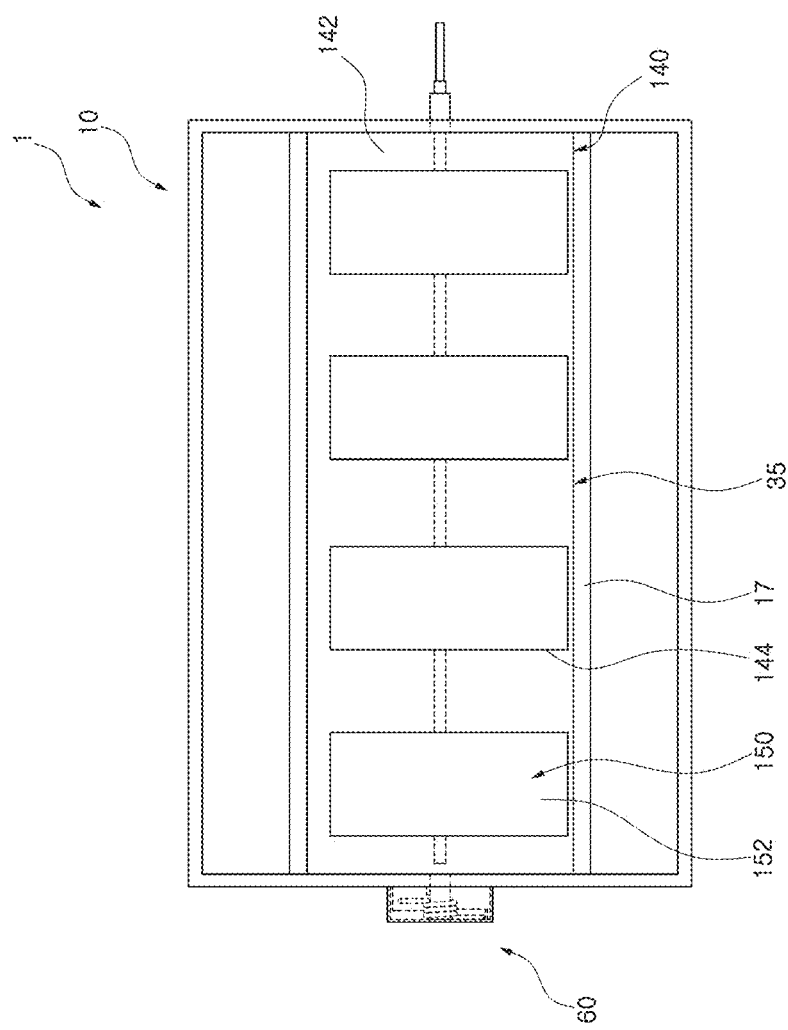
FIG. 20 is a front view illustrating the air vent for a vehicle in accordance with the embodiment of the present invention.

FIG. 19 is a perspective view illustrating an air vent for a vehicle in accordance with another embodiment of the present invention, and FIG. 20 is a front view illustrating the air vent for a vehicle in accordance with the embodiment of the present invention.

As illustrated in FIGS. 19 and 20, the air vent 3 for a vehicle in accordance with the embodiment of the present invention may have a structure in which a first rotating member 140 of a second adjusting part 35 is rotatably installed in the duct part 10. The first rotating member 140 may have a plate-shaped first rotating body 142 in which a plurality of connection paths 144 are installed so as to be separated from each other at preset intervals.

In each of the connection paths 144, a second rotating body 152 of a second rotating member 150 may be rotatably installed. The second rotating body 152 may be rotated by power transferred from the driving part 70, and the first rotating body 142 may be connected to the rotation pressing part 60 and rotated in one direction. Since the operations of the first and second rotating members 140 and 150 are performed in the same manner as the above-described embodiment, the detailed descriptions thereof are omitted herein.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:
1. An air vent for a vehicle, comprising:
an air duct having an internal path through which air is moved;
a first barrier configured to rotate in the air duct about a first axis, the first barrier being configured to guide a direction of air in the air duct while being rotated in a side-to-side direction about the first axis;
a second barrier configured to rotate in the air duct about a second axis, the second barrier being configured to adjust a flow rate and the direction of air in the air duct while being rotated in an upward/downward direction or blocking a passage of air in the air duct;

a driver connected to the second barrier and being configured to supply power to rotate the second barrier; and a torsion spring assembly connected to the second barrier and being configured to elastically bias the second barrier to rotate in one direction, wherein the second barrier comprises a first rotating planar member rotatably installed in the air duct, the first rotating planar member biased by the torsion spring assembly to be rotated in the one direction, and constrained by a stopper form rotating more than a preset angle, and a second rotating planar member inset in an opening formed in the first rotating member, and being configured to be rotated by the drive, and wherein the second rotating planar member having a protrusion disposed on an edge distal to the second axis and configured to contact an edge of the opening and configured to push the first rotating member.

2. The air vent of claim 1, wherein the first barrier comprises:
a baffle rotatably installed in the air duct and extended in a top-to-bottom direction; and
a groove formed at a side surface of the baffle.

3. The air vent of claim 1, wherein the stopper protrudes to the inside of the air duct, and constrains the second barrier from being rotated more than the preset angle.

4. The air vent of claim 1, wherein the first rotating planar member comprises: a first rotating plate having the second rotating planar member rotatably disposed therein; and a first connecter extended from the first rotating plate and connected to the torsion spring assembly.

5. The air vent of claim 4, wherein the second rotating planar member comprises: a second rotating plate rotatably installed in the first rotating planar member; and a second connecter connecting the second rotating plate to the driver, and configured to be rotated by the driver.

6. The air vent of claim 5, wherein the second rotating plate is locked to an inner edge of the first rotating plate such that the first and second rotating bodies rotate together.

7. The air vent of claim 5, wherein the second rotating plate comprises a single member or a plurality of members, and has the same rotation center as the first rotating plate.

8. The air vent of claim 5, wherein the driver comprises:
a driving body fixed to the air duct; and
an output shaft installed on a side of the driving body and having the second connector inserted therein.

9. The air vent of claim 4, wherein the torsion spring assembly is connected to the first connector and comprises a torsion spring.

* * * * *